US009388791B2

(12) United States Patent
Brooks et al.

(10) Patent No.: US 9,388,791 B2
(45) Date of Patent: Jul. 12, 2016

(54) MOUNTING ARRANGEMENT FOR LOAD COMPENSATING DEVICE

(71) Applicant: Frontier Wind, LLC, West Conshohocken, PA (US)

(72) Inventors: Peter Everett Brooks, Rochester, MN (US); Nathan John Burgess, Rochester, MN (US); Myron Floyd Miller, West Lafayette, IN (US)

(73) Assignee: Frontier Wind, LLC, West Conshohocken, PA (US)

( * ) Notice: Subject to any disclaimer, the term of this patent is extended or adjusted under 35 U.S.C. 154(b) by 718 days.

(21) Appl. No.: 13/831,951

(22) Filed: Mar. 15, 2013

(65) Prior Publication Data

US 2014/0271191 A1     Sep. 18, 2014

(51) Int. Cl.
*B64C 27/615* (2006.01)
*F03D 7/02* (2006.01)

(52) U.S. Cl.
CPC .............. *F03D 7/022* (2013.01); *F03D 7/0232* (2013.01); *F03D 7/0256* (2013.01); *F05B 2240/313* (2013.01); *F05B 2240/90* (2013.01); *Y02E 10/721* (2013.01); *Y02E 10/722* (2013.01); *Y02E 10/723* (2013.01)

(58) Field of Classification Search
CPC ..... F03D 1/065; F03D 7/0236; F03D 7/0232; F03D 7/022; F03D 7/0256; F05B 2240/31; F05B 2240/313; F05B 2240/90; Y02E 10/721; Y02E 10/723; Y02E 10/722
USPC ................... 416/23, 24, 87, 142, 240, 132 B
See application file for complete search history.

(56) References Cited

U.S. PATENT DOCUMENTS

| 2,076,520 | A | * | 4/1937 | Swanson | F03D 7/0252 416/132 B |
| 2,491,742 | A | * | 12/1949 | Lein | F16B 9/026 220/3.6 |
| 2,867,344 | A | * | 1/1959 | Nickell | H02B 1/044 220/3.6 |
| 2,943,825 | A | * | 7/1960 | Lane | B64C 1/14 244/129.1 |
| 4,120,473 | A | * | 10/1978 | Suk | H02G 3/123 220/3.5 |
| 5,424,105 | A | * | 6/1995 | Stewart | B29C 73/10 244/119 |
| 5,603,424 | A | * | 2/1997 | Bordwell | H02G 3/123 220/3.5 |
| 8,491,262 | B2 | * | 7/2013 | McGrath | F03D 7/0252 416/1 |
| 8,734,104 | B2 | * | 5/2014 | Colling | F03D 7/0252 416/1 |

(Continued)

OTHER PUBLICATIONS

Mar. 19, 2015—(CA) Office Action—App 2,845,899.
Mar. 19, 2015—(JP) Reasons for Rejection—2014-052921.
Oct. 22, 2015—(CA) Office Action—App 2,845,899.

*Primary Examiner* — Audrey K Bradley
*Assistant Examiner* — Jason T Newton
(74) *Attorney, Agent, or Firm* — Banner & Witcoff, Ltd.

(57) ABSTRACT

A mounting arrangement for a load compensating device is provided. The mounting arrangement includes a cover sheet connected to a housing via a plurality of protrusions. The cover sheet may form a portion of a surface of an airfoil rotor blade. The housing may include a plurality of clamps extending outward from the housing and configured to contact an inner surface of the airfoil rotor blade. By tightening the clamps onto the interior surface, the device is mounted to the blade and the cover sheet may deform to correspond to the airfoil geometry of the airfoil rotor blade. The mounting arrangement may further include a mounting plate configured to permit the housing to float within the aperture formed in the airfoil rotor blade, and a tab arranged on one end of the mounting plate to distribute centrifugal force to the surface of the airfoil rotor blade.

5 Claims, 14 Drawing Sheets

(56) References Cited

U.S. PATENT DOCUMENTS

| | | | |
|---|---|---|---|
| 8,864,462 B2 * | 10/2014 | Mayda | F03D 11/0025 416/1 |
| 2009/0284016 A1 * | 11/2009 | van Dam | F03D 1/06 290/54 |
| 2009/0285682 A1 * | 11/2009 | Baker | F03D 1/0641 416/1 |
| 2011/0223022 A1 * | 9/2011 | Wang | F03D 7/0252 416/23 |
| 2011/0223033 A1 * | 9/2011 | Wang | F03D 1/0608 416/235 |
| 2012/0134814 A1 * | 5/2012 | McGrath | F03D 7/0252 416/23 |
| 2014/0271184 A1 * | 9/2014 | Baker | F03D 7/022 416/1 |
| 2014/0271192 A1 * | 9/2014 | Brooks | F03D 7/022 416/23 |
| 2015/0010400 A1 * | 1/2015 | Vossler | F03D 7/0252 416/23 |

* cited by examiner

MOUNTING ARRANGEMENT FOR LOAD COMPENSATING DEVICE

BACKGROUND

Wind turbines create power proportional to the swept area of their blades. The choice of rotor attributes for a wind turbine, such as its diameter, is a design trade-off between longer blades for more energy production in low winds and shorter blades for load limitation in high winds. Thus, wind turbine having longer blades will increase the swept area, which in turn produces more power. However, at high wind speeds, a wind turbine having longer blades places greater demands on the components and creates more situations where the turbine must be shut down to avoid damaging components. Even in situations where the average wind speed is not high enough to cause damage, periodic wind gusts which change both the speed and direction of the wind, apply forces that may be strong enough to damage equipment.

In some wind turbine arrangements, deflectors are used to optimize wind turbine loading. Mounting of these deflectors can be difficult because of the amount of stress on the various components. Further, conventional mounting of the devices can involve machining parts for each particular use in order to correspond to the geometry of the airfoil at the location of mounting. Requiring a specific design for each part can be costly, time consuming and inefficient.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the arrangements described herein include one or more mounting arrangements for an air deflector on a wind turbine blade. In some arrangements, the air deflector may include a housing and a cover sheet forming a portion of a surface of the wind turbine blade and connected to the housing. The housing may include a plurality of clamps configured to connect the housing to the wind turbine blade. In some arrangements, the air deflector apparatus may include a mounting plate having a tab configured to distribute load to a surface of the wind turbine blade during operation of the wind turbine.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the arrangements described herein may include a load compensating device mounted in an airfoil rotor blade. In some arrangements, the load compensating device may include a deployable device, such as an air deflector, and may be mounted to a wind turbine blade. To simplify discussion of the arrangements described herein, various aspects will be described in the context of a load compensating device mounted to a wind turbine blade or airfoil rotor blade. However, the features described herein may be used in a variety of devices and applications and nothing in the specification or figures should be viewed as limiting the invention to an air deflector mounted in a wind turbine blade.

During operation of the wind turbine, the air deflector may be deployed to manage loads and/or optimize operation of the wind turbine. The air deflector may be part of a gusdt compensating device and may be mounted to an interior surface of the airfoil rotor blade. The load compensating device may include a cover sheet forming a portion of a surface of the airfoil rotor blade. The cover sheet may be connected to a housing of the load compensating device via one or more protrusions extending downward from a bottom surface of the cover sheet. The housing may include a plurality of clamps arranged on the housing and configured to connect the housing to the airfoil rotor blade, as will be discussed more fully below.

Figure 1:
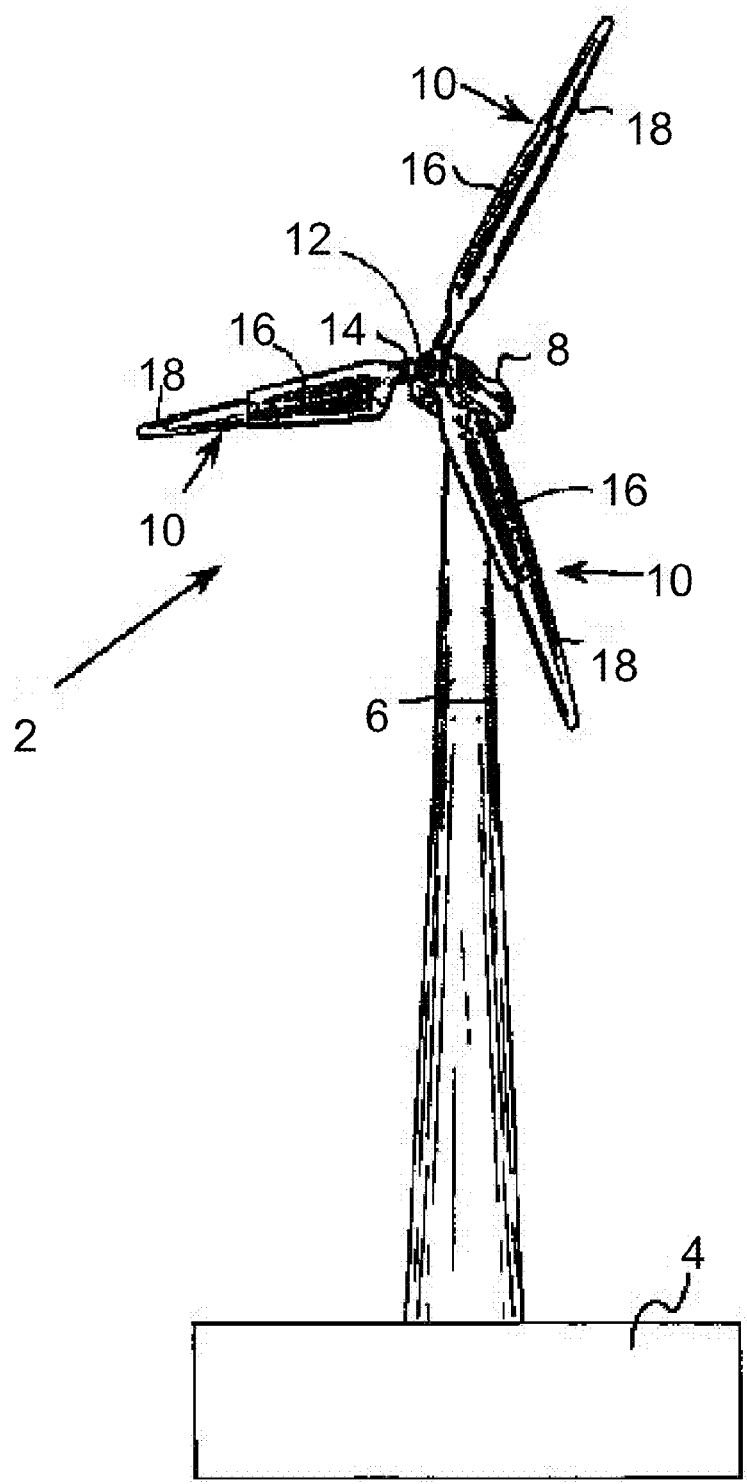
FIG. 1 is a perspective view of a wind turbine according to one or more aspects described herein.

FIG. 1 shows a wind turbine 2 on a foundation 4 with a tower 6 supporting a nacelle 8. One or more blades 10 are attached to a hub 12 via a bolt flange 14. In the depicted embodiment, the wind turbine includes three blades 10. The hub 12 is connected to a gear box, a generator, and other components within the nacelle 8. The blades 10 may have a fixed length or may be of the variable length-type, i.e., telescopic, such as shown in FIG. 1. As shown in FIG. 1, each variable length blade 10 includes a root or base portion 16 and a tip portion 18. The tip portion 18 is movable with respect to the root portion 16 so as to controllably increase and decrease the length of the rotor blade 10, and in turn, respectively increase and decrease the swept area of the rotor blades 10. Any desirable drive system, such as a screw drive, a piston/cylinder, or a pulley/winch arrangement may be used to move the tip portion 18 with respect to the root portion 16. Such drive systems are described in U.S. Pat. No. 6,902,370, which is hereby incorporated by reference. The wind turbine 2 further includes a yaw drive and a yaw motor, not shown.

FIGS. 2-5 show a cross section of a wind turbine blade 10 containing at least one load compensating device 30, which may include an air deflector. The blade 10 has a leading edge 20, a trailing edge 22, a high pressure side 24 and a low pressure side 26. A chord line c can be defined as a line between the leading edge 20 and trailing edge 22 of the blade 10. It is recognized that the leading side of the rotor blade 10 corresponds to the leading half of the rotor blade 10 and the trailing side of the rotor blade 10 to the trailing half of the rotor blade 10.

The blade 10 depicted in the figures is merely one illustrative cross-sectional design or airfoil geometry and it is recognized that infinite cross-sectional variations can be used as part of the present invention. The airfoil rotor blade may be made of any suitable construction and materials, such as fiberglass and/or carbon fiber.

Figure 2:
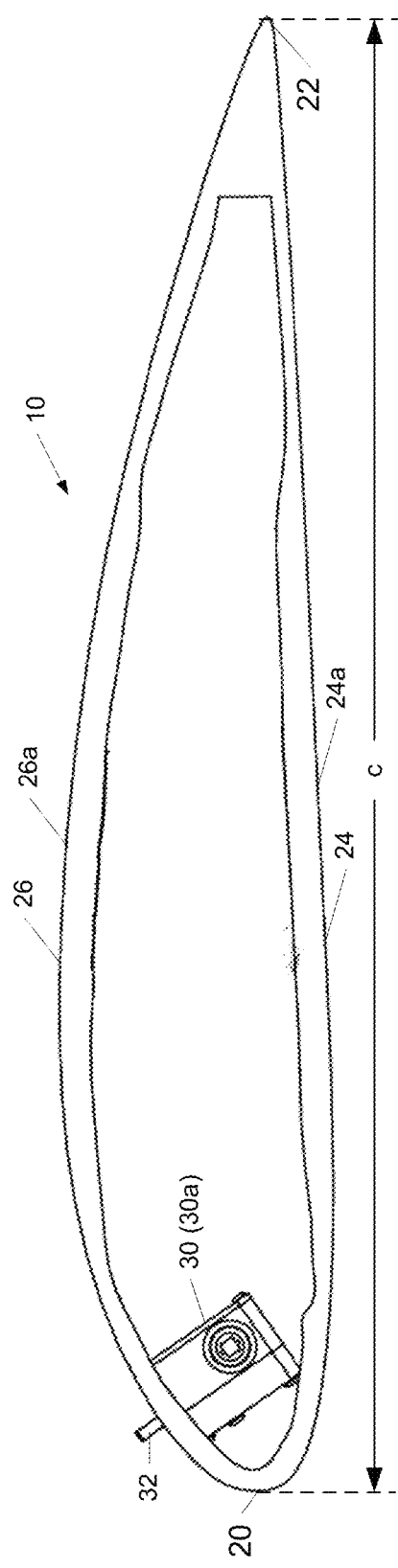
FIG. 2 is a cross-section through a rotor blade depicting a first load compensating device with the air deflector in an extended position according to one or more aspects described herein.
Figure 3:
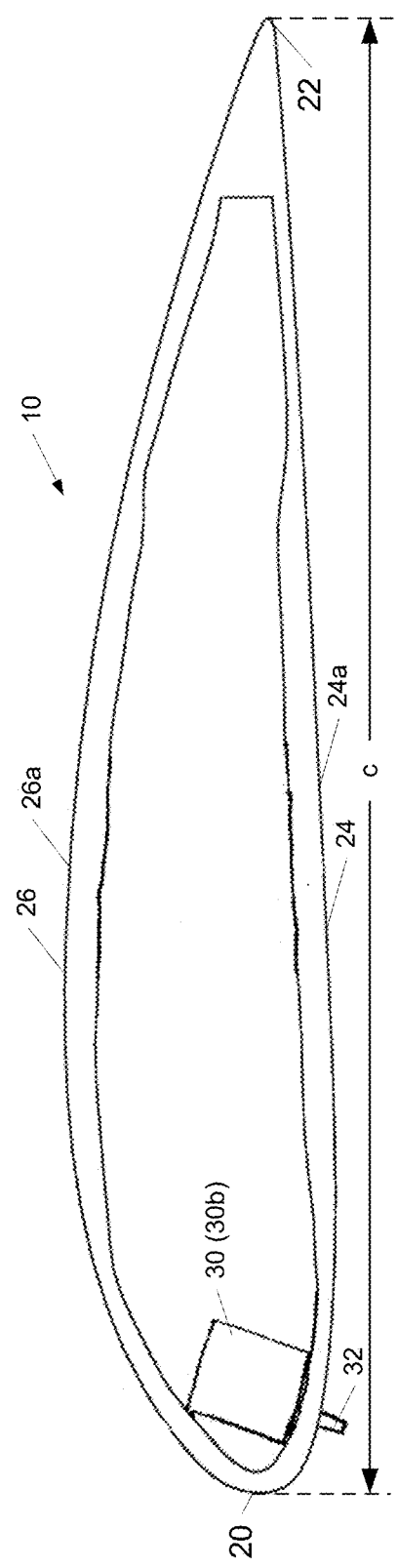
FIG. 3 is a cross-section through the rotor blade depicting a second load compensating device with the air deflector in an extended position according to one or more aspects described herein.

As can be seen in cross sections of FIGS. 2 and 3, the rotor blade 10 further includes at least one load compensating device, generically referenced to as reference number 30, but specifically referred to as reference number 30a and 30b with reference to a specific side of the rotor blade 10. FIG. 2 depicts a placement of a first wind load compensating device 30a to affect the airflow on the low pressure side 26 of the rotor blade 10. FIG. 3 depicts a placement of a second wind load compensating device 30b to affect the airflow on the high pressure side 24 of the rotor blade 10. It is recognized that in use, the more curved surface 26a and the opposing less curved surface 24a create the dynamics of the low pressure side 26 and the high pressure side 24 due to well known principles of aerodynamics. This, in combination with the airflow over the rotor blade 10, creates an effect known as "lift" that assists in the rotation of the rotor.

In one embodiment, each rotor blade 10 includes at least one first wind load compensating device 30a to affect the airflow on the low pressure side 26 and at least one second wind load compensating device 30b to affect the airflow on the high pressure side 24. That is, it includes wind load compensating devices 30a and 30b, and these devices 30a, 30b may be longitudinally spaced along the rotor blade 10. Any desired number of these devices 30a, 30b may be used. In another embodiment, each rotor blade 10 includes at least one wind load compensating device 30a to affect the airflow on the low pressure side 26 and no wind load compensating devices on the high pressure side 24. Any desired number of the devices 30a may be used on the low pressure side 26. In yet another embodiment, each rotor blade 10 includes at least one wind load compensating device 30b on the high pressure side 24 and no wind load compensating devices on the low pressure side 26. Any desired number of the devices 30b may be used on the high pressure side 24.

Figure 4:
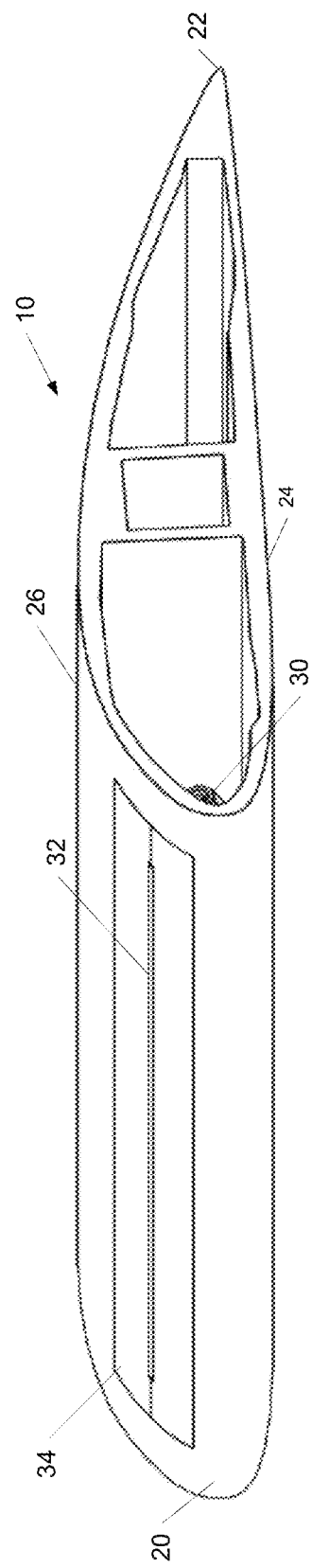
FIGS. 4 and 5 are isometric sectional views through the rotor blade depicting the load compensating device of FIG. 2 with the air deflector in a retracted position (FIG. 4) and in an extended position (FIG. 5) according to one or more aspects described herein.

Each wind load compensating device 30a, 30b includes an air deflector 32. The air deflector 32 is movable between an extended position in which the air deflector 32 extends from an exterior surface of the airfoil rotor blade 10 and a retracted position in which the air deflector 32 is substantially flush with, recessed, or otherwise does not materially extend from the exterior surface of the airfoil rotor blade 10. FIGS. 2 and 3 both show the air deflector 32 in an extended position wherein the air deflector 32 extends from the exterior surface of the rotor blade 10. FIG. 4 is an isometric sectional view through the rotor blade 10 depicting the wind load compensating device 30a in its retracted position.

In a first arrangement, the location of the air deflectors 32 with respect to the leading edge 20 and the trailing edge 22 of the airfoil rotor blade 26 is in the leading half, i.e., is between 0%-50% of the length of the chord c when measured perpendicularly thereto from the leading edge 20 to the trailing edge 22. In another arrangement, the location of the air deflectors 32 with respect to the leading edge 20 and the trailing edge 22 of the airfoil rotor blade 26 is between 5%-45% of the length of the chord c when measured perpendicularly thereto from the leading edge 20 to the trailing edge 22. In yet another arrangement, the location of the air deflectors 32 with respect to the leading edge 20 and the trailing edge 22 of the airfoil rotor blade 26 is between 15%-35% of the length of the chord c when measured perpendicularly thereto from the leading edge 20 to the trailing edge 22. In some examples, the thickness of a surface of the airfoil rotor blade to which the load compensating devices 30 are mounted may vary.

The air deflector 32 may be sized based on the desired wind turbine condition parameter and further in view of the number of load compensating devices used. The air deflector may be made from any suitable material, such as fiberglass, carbon fiber, stainless steel, plastic (such as polycarbonate), and/or aluminum. The air deflector 32 may be of any desired width, for example from a few inches to over a foot. Additionally, air deflector 32 may extend from the airfoil surface to any desired height, e.g., from less than a percent to a few percent of the chord c (FIG. 3), and they may have any suitable thickness based on the material chosen, typically less than one inch.

Figure 5:
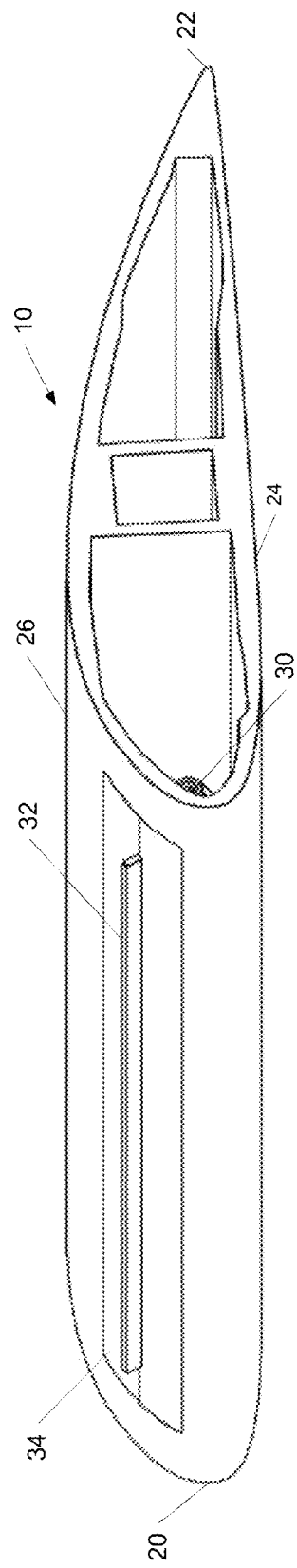

FIGS. 4 and 5 are isometric sectional views through the rotor blade 10 depicting the low pressure side wind load compensating device 30 with the air deflector 32 in a retracted position (FIG. 4) and in an extended position (FIG. 5). The wind load compensating device 30 is suitably mounted by an interface to substantially maintain the surface contour the rotor blade 10. Various mounting arrangements, and interface arrangements will be discussed more fully below.

Figure 6:
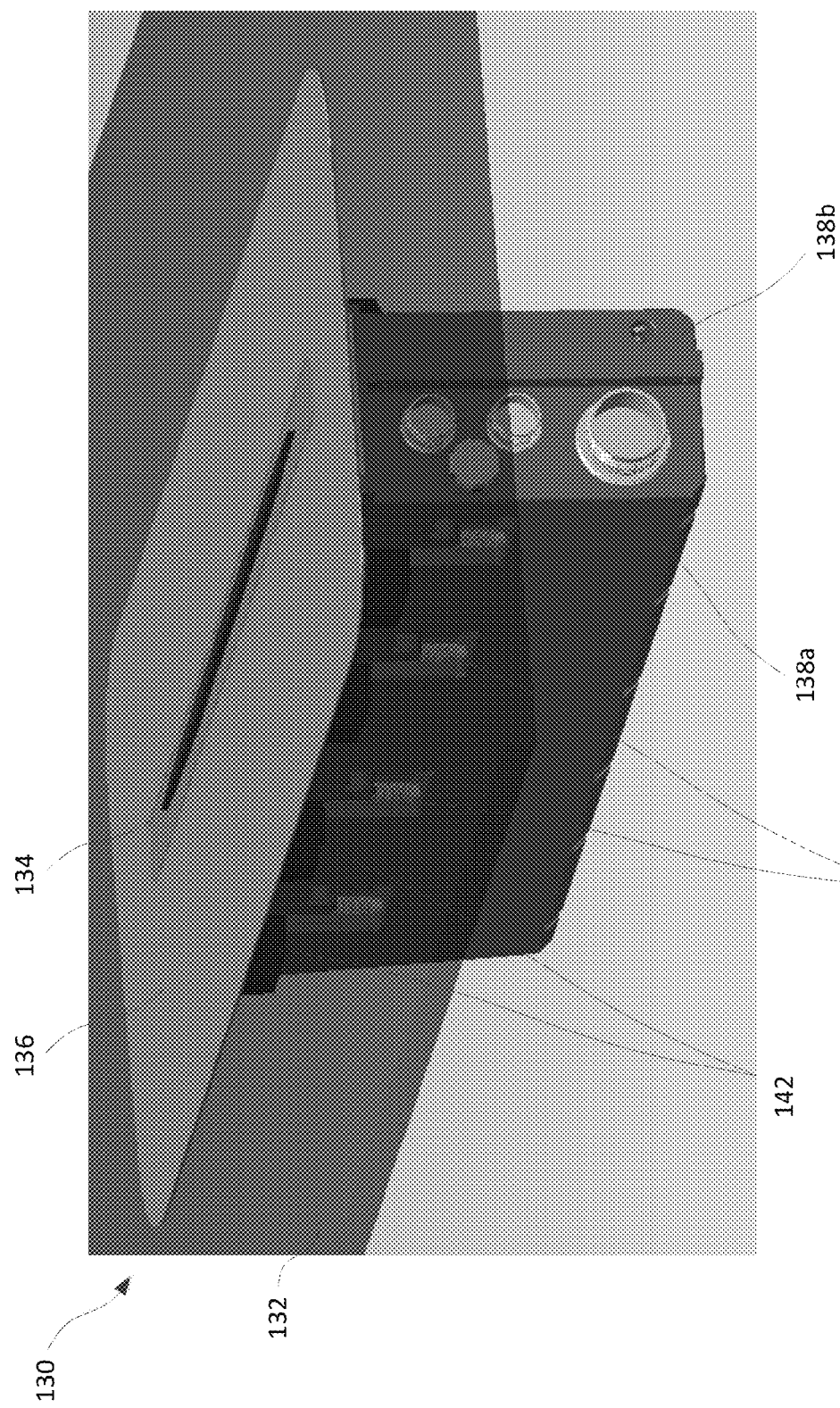
FIG. 6 illustrates one example load compensating device according to one or more aspects described herein.

FIG. 6 illustrates one example load compensating device 130 according to various aspects described herein. One or more features, as well as the operation of load compensating device 130 may be substantially similar to load compensating device 30 discussed above. Further, load compensating device 130 may be mounted at any location along an airfoil rotor blade, as discussed above. Various features of load control devices and the operation of one or more load control devices may be found in U.S. Pat. No. 8,267,654, which is incorporated herein by reference.

Load compensating device 130 is shown mounted in an airfoil rotor blade 132. The airfoil rotor blade may have one of various airfoil cross-sectional geometries. The load compensating device 130 is generally mounted on an interior of the airfoil rotor blade 132. That is, the load compensating device 130 is mounted to a surface of the airfoil rotor blade 132 such that the load compensating device is substantially contained within the airfoil rotor blade 132. The load compensating device 132 includes aperture 134 through which an air deflector may deploy. As discussed above, the air deflector may aid in optimizing operation of a wind turbine.

Load compensating device 130 further includes a cover sheet 136. In some arrangements, the cover sheet 136 may form a portion of an exterior surface of the airfoil rotor blade 132. Accordingly, in order to maintain the flow properties over the surface of the airfoil rotor blade 132, it is advantageous to have the cover sheet 136 include a continuous surface with few, if any interruptions. As shown in FIG. 6, the cover sheet 136 includes a majority of the surface being void of interruptions and/or substantially smooth. For example, there are no connector, fittings, etc. extending through the cover sheet 136, as in some conventional arrangements.

The cover sheet 136 may be formed of any suitable material, such as fiberglass, carbon fiber, various other composite materials, aluminum, stainless steel, various plastics, and the like. The cover sheet 136 may, in some examples, be deformable to conform to an airfoil geometry of the airfoil rotor blade 132 at a location of the load compensating device. These arrangements will be discussed more fully below.

Figure 7:
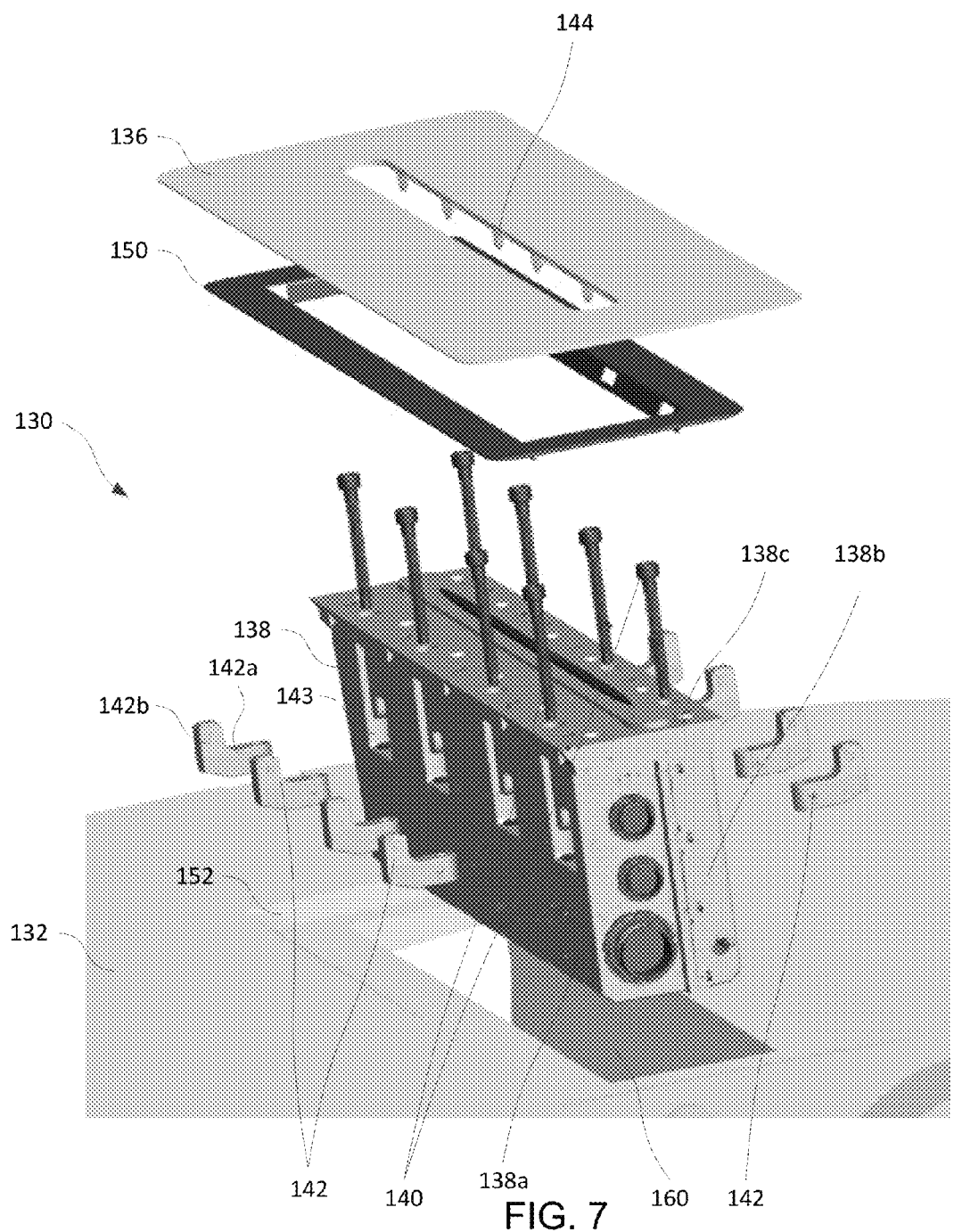
FIG. 7 is an exploded view of the load compensating device of FIG. 6 according to one or more aspects described herein.

The cover sheet 136 may be connected to a housing 138 of the load compensating device 130, as will be discussed more fully below. The housing 138 may substantially contain the air deflector, air deflector deployment mechanism, and various other components. In some examples, the housing 138 may be formed of two portions 138a, 138b that may be joined together using known methods of connection, such as screws, bolts, and the like. The housing 138 may be provided in more than one portion. For instance, the housing 138 may be provided in two portions. In other examples, the housing 138 may be provided in three portions, as shown in FIG. 7. The housing 138 may include two side portions 138a, 138b and a top portion 138c which, in some examples, may include a slot through which the air deflector will slide. Forming the housing in multiple portions may facilitate any maintenance that may be needed or desired on the air deflector, air deflector deployment mechanism, or other components contained within the housing 138. The housing 138 may be formed of any suitable material, such as fiberglass, carbon fiber, other composite materials, aluminum (e.g., cast aluminum), stainless steel, various plastics, and the like.

To mount the load compensating device 130 to the airfoil rotor blade 132, a plurality of clamps 142 and fasteners 140 may be used. In some examples, the fasteners 140 may extend through clamps 142 and both may be threaded to allow movement of the clamp 142 along a length of the fastener 140. The clamp 142 may extend upward, along the length of the fastener 140 to contact an interior surface of the airfoil rotor blade 130, thereby connecting the load compensating device 130 to the airfoil rotor blade 132, as will be discussed more fully below. The clamps 142 and fasteners 140 may be formed of any suitable material, such as composite materials, aluminum, stainless steel, and the like. In some examples, NYLON or other thread locking material may be installed on the clamp threads.

FIG. 7 illustrates the load compensating device 130 in an exploded view. As shown in FIG. 7, the load compensating device 130 may be received in aperture 160 formed in the airfoil rotor blade 132. In some arrangements, the airfoil rotor blade 132 may include a recess 152 formed in the exterior surface and surrounding the aperture 160. The recess 152 may be configured to receive mounting plate 150, as will be discussed more fully below.

As discussed above, the load compensating device 130 may include a cover sheet 136 connected to the housing 138. In some examples, the cover sheet 136 may be connected to the housing 138 via a plurality of protrusions 144 extending downward from a bottom surface of the cover sheet 136 and extending through aperture 160 in airfoil rotor blade 132. In some arrangements, the protrusions 144 may be received in a plurality of apertures formed in the housing, as will be discussed more fully below.

The cover sheet 136 may contact a top surface of the airfoil rotor blade 132 and may, in some arrangements, form a portion of the top surface of the airfoil rotor blade 132. Accordingly, the cover sheet 136 should conform to or substantially conform to the airfoil rotor blade geometry at the location at which the load compensating device 130 is located.

FIG. 7 further illustrates the plurality of fasteners 140 and clamps 142. In some arrangements, the fasteners may be threaded fasteners, such as screws, threaded rods, etc. The fasteners 140 may extend downward, through the housing 138 and through an aperture formed in each clamp 142 positioned in recesses 143. In some examples, the clamps 142 may be substantially L-shaped to include a horizontal portion 142a received in recess 143 and including aperture through which the fastener 140 may extend. The clamp 142 may further include a substantially vertical portion 142b protruding outward from the horizontal portion 142a. The vertical portion 142b may include an end that may contact the airfoil rotor blade 132 (e.g., on an interior surface) to connect the load compensating device 130 to the airfoil rotor blade 132.

In some examples, the clamp 142 may be forced toward the outer surface of the airfoil rotor blade 132 by rotating fastener 140. That is, rotating fastener 140 will cause the clamp 142 to move along the length of the fastener 140. Accordingly, as the clamp 142 contacts the interior surface of the airfoil rotor blade 132 and the fastener 140 is further rotated, the clamp 142 will draw into the surface of the airfoil rotor blade 132 causing a connecting force counteracted by the mounting plate 150 which is in contact with an opposite, outer surface of the airfoil rotor blade 132. In some examples, this connecting force will cause the cover sheet 136 (connected to housing 138 by protrusions 144) to deform to substantially conform to the airfoil geometry of the airfoil rotor blade 132. Accordingly, because the cover sheet 136 may deform to the particular geometry at the location at which the load compensating device 130 is mounted, the cover sheet 136 and associated mounting arrangement including clamps 142, fasteners 140, etc. may be used with any airfoil geometry and at any position along the airfoil, regardless of geometry.

Figure 8:
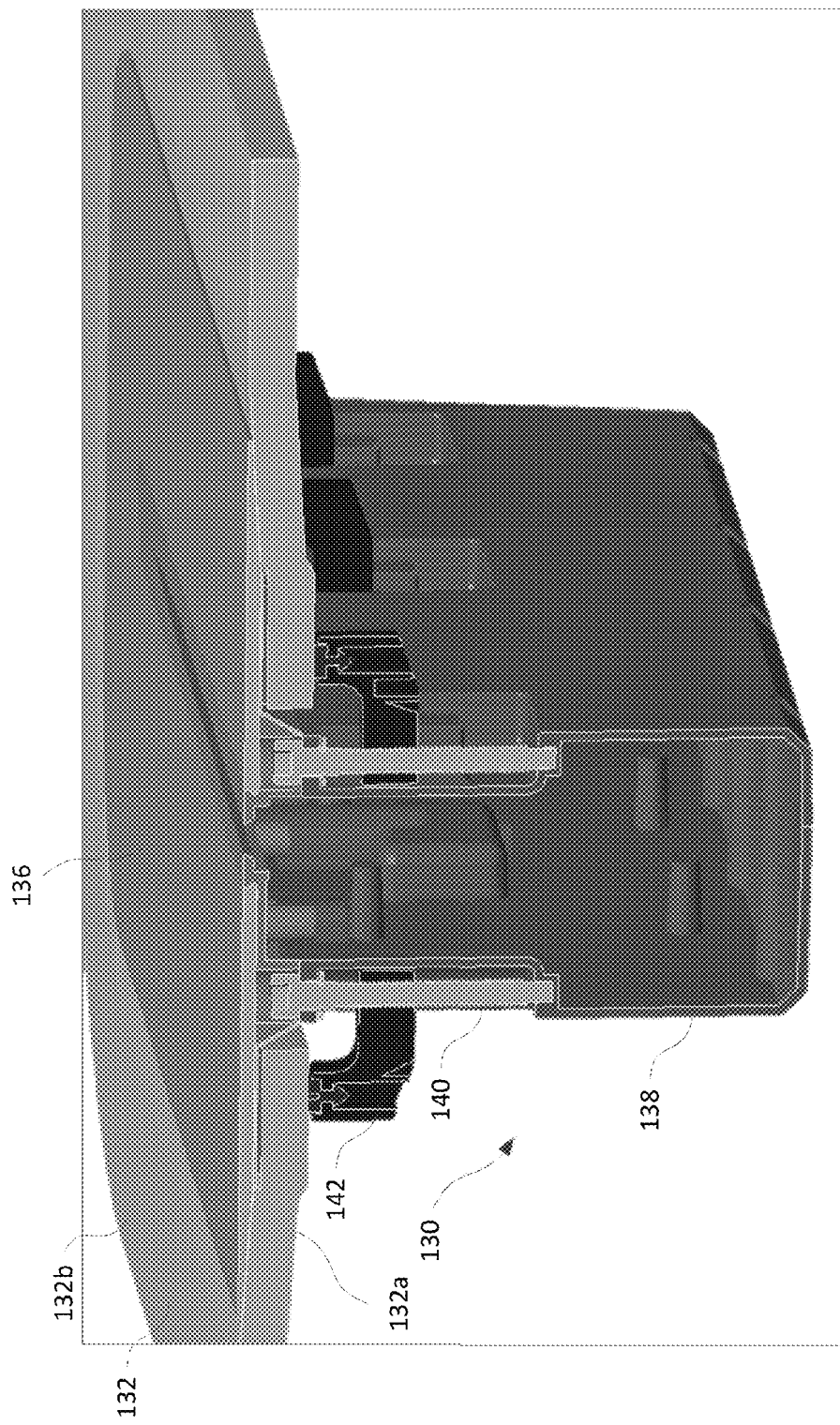
FIG. 8 is a cross-sectional view of the load compensating device mounted to an airfoil rotor blade according to one or more aspects described herein.

FIG. 8 is a cross-sectional view of the load compensating device 130 mounted to an airfoil rotor blade 132. As discussed above, the cover sheet 136 contacts an outer surface 132b of the airfoil rotor blade 132 and is connected to the housing 138 by a plurality of protrusions, as will be discussed more fully below. The clamps 142 as shown drawn into the interior surface 132a of the airfoil rotor blade 132. In some arrangements, as the clamps 142 are tightened onto the surface of the airfoil rotor blade, they will draw the cover sheet 136 down, onto the outer surface 132b of the airfoil rotor blade 132 and will cause it to deform to match or substantially conform to the geometry of the airfoil at that location. In some examples, the cover sheet 136 may have a first radius of curvature in an uninstalled arrangement and a second radius of curvature in an installed arrangement, with the second radius of curvature being greater than the first radius of curvature (e.g., the cover sheet 136 will flatten out when installed). For example, in some arrangements, the cover sheet will have a radius of curvature of between 0.5 and 1.5 meters in an uninstalled arrangement. When installed, the cover sheet may "flatten out" and the radius of curvature may be between 3 meters and 4.5 meters.

Figure 9:
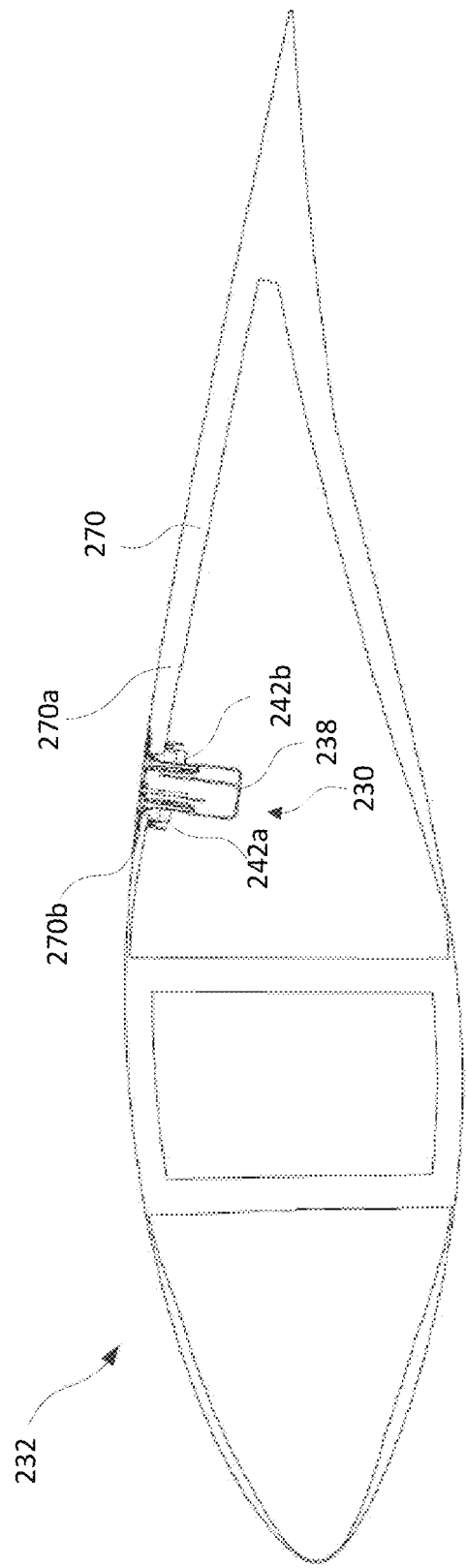
FIG. 9 is a cross-section of an airfoil rotor blade depicting the load compensating device mounted on an interior of the blade according to one or more aspects described herein.

In some examples, each clamp 142 may be operated independently of the other clamps 142. Accordingly, the load compensating device 130 may be mounted to an airfoil rotor blade having varying thickness. For instance, FIG. 9 is a cross-section of an airfoil rotor blade 232. The load compensating device 230 is mounted on an interior of the airfoil rotor blade 232. Similar to the arrangements discussed above, the load compensating device 230 includes a plurality of clamps 242 arranged on at least one side of the housing 238. As shown in FIG. 9, the clamps 242 are arranged on two, opposite sides of the housing 238. The clamps 242 are shown engaged with the airfoil rotor blade surface to mount the load compensating device 230 to the airfoil rotor blade 232.

In the arrangement of FIG. 9, the load compensating device 230 is mounted to an upper surface 270 of the airfoil rotor blade 232. The upper surface 270 has a varying thickness along the cross-section. For instance, portion 270a is thicker than 270b. Accordingly, clamp 242a will be arranged at a position along corresponding fastener (not shown) that is different from clamp 242b, which will mount the housing 238 to the airfoil rotor blade 232 at a thinner portion 270b of the upper surface 270. Because each clamp 242 may operate independently of each other, the clamps may be positioned or arranged as needed, depending on the airfoil geometry and can be generally used universally with any airfoil geometry. In some examples, the clamps may be adjustable to accommodate a blade thickness of between 5 mm and 40 mm.

Figure 10:
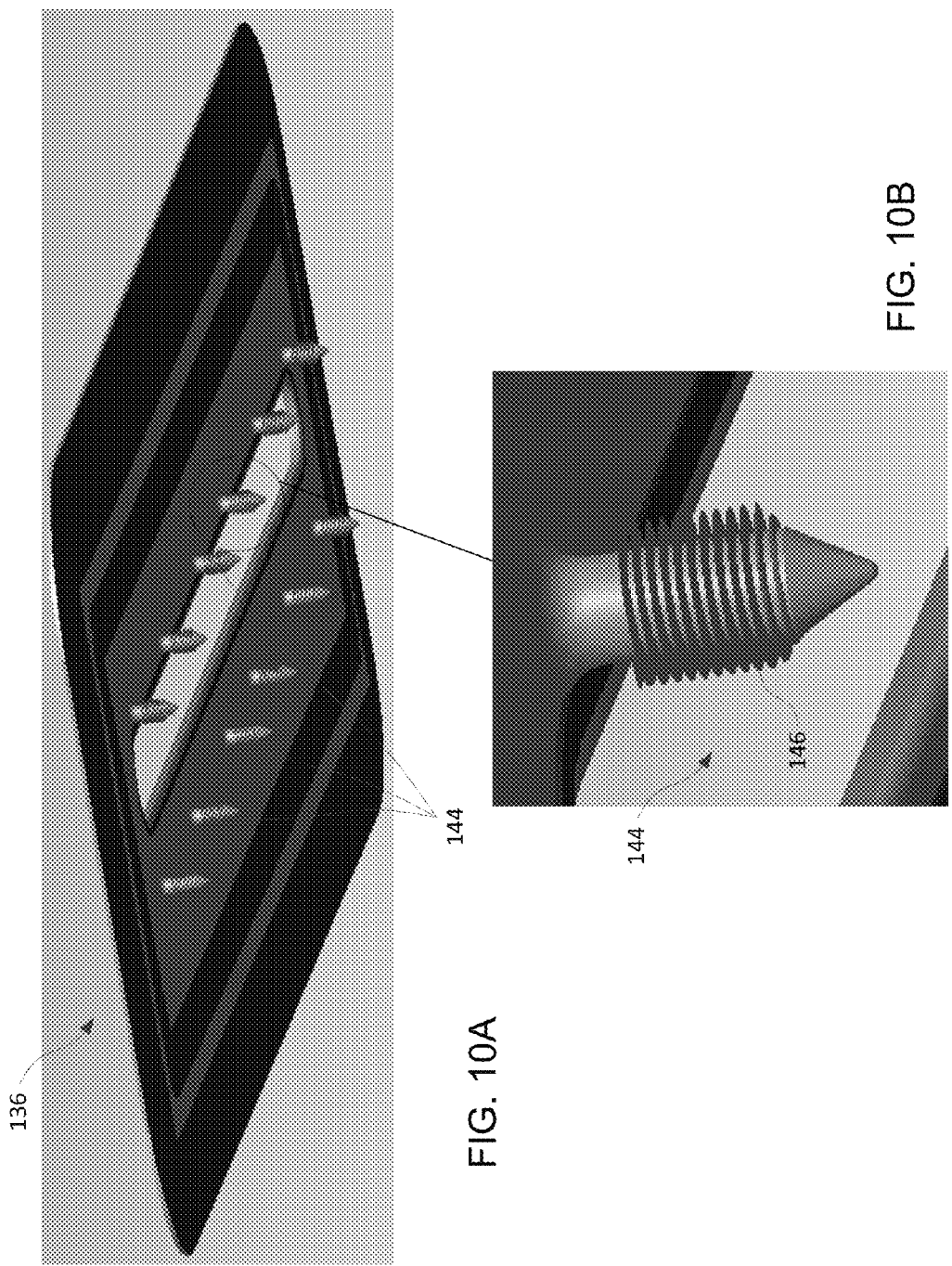
FIGS. 10A and 10B illustrate a cover sheet that may be used with the load compensating device and an enlarged view of the protrusions extending from the cover sheet, respectively.

FIGS. 10A and 10B further illustrate the cover sheet 136 and cover sheet protrusions 144. FIG. 10A is a bottom view of the cover sheet 136. The bottom or inward (e.g., toward an interior of an airfoil rotor blade to which the cover sheet is connected) side of the cover sheet 136 includes a plurality of protrusions 144 for connecting the cover sheet to the housing (not shown in FIGS. 10A and 10B). The protrusions 144 may be integrally formed with the cover sheet 136. For instance, during manufacture of the cover sheet 136, the protrusions 144 may be integrally formed with the remainder of the cover sheet 136, to provide a one-piece cover sheet 136 with protrusions 144 extending therefrom. In some examples, the cover sheet 136 and protrusions 144 may be formed using a molding operation. Connecting the cover sheet 136 to the housing 138 using the protrusions 144 extending from the bottom side may facilitate connecting the cover sheet 136 to the housing 138 without the use of a fastener having a fastener head exposed on the exterior surface of the cover sheet 136. Eliminating the exposed fastener heads may aid in reducing or eliminating air flow disruptions over the surface of the blade. Further, fasteners having heads exposed on the surface of the blade may be subject to shearing due to various forces on the blade. Accordingly, mounting the cover sheet without any exposed fastener heads reduces or eliminates this issue and the associated repair.

Figure 11:
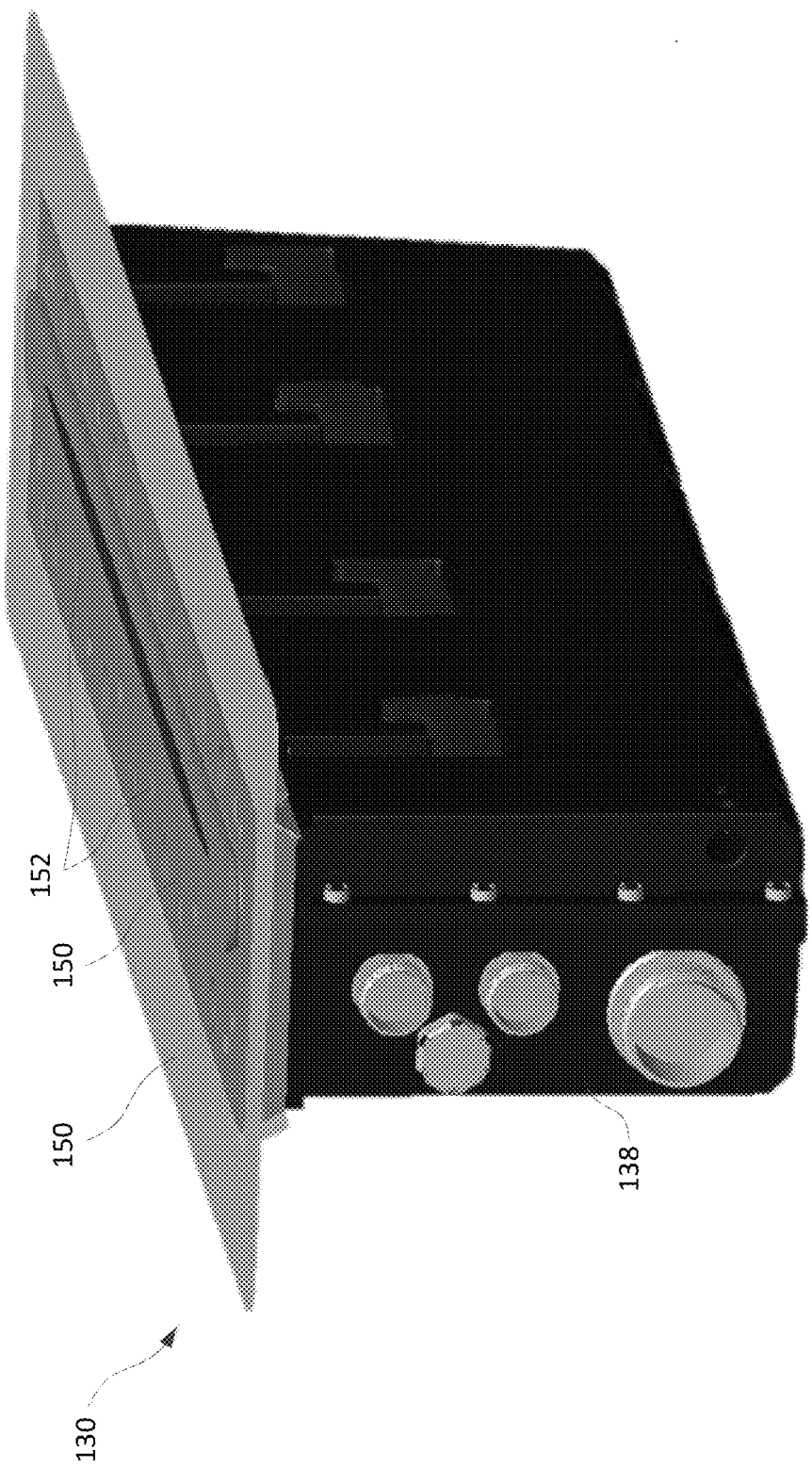
FIG. 11 illustrates the load compensating device with the cover sheet removed according to one or more aspects described herein.

As shown in the enlarged view of protrusion 144 in FIG. 10B, the protrusions 144 may be a "Christmas tree" type fastener having a plurality of threads or barbs 146 extending around the protrusion 144, thereby forming a "Christmas tree" type shape. The protrusions 144 may have a variety of other shapes, arrangements, configurations, etc. without departing from the invention. The protrusions 144 may be received in a plurality of threaded apertures (152 in FIG. 11) formed on a top surface of the housing 138. FIG. 11 illustrates one example housing 138 having a plurality of apertures 152 arranged in a top surface 154. The apertures 152 are configured to receive the protrusions 144 extending downward from the cover sheet 136. In some arrangements, the protrusions 144 may snap fit into the apertures 152. For instance, the threads or barbs 146 may snap into corresponding threads on the interior of the aperture 152 to secure the cover sheet 136 to the housing 138. In some examples, the protrusions 144 may extend through apertures formed in mounting plate 150 and into the apertures 152.

As discussed above, the protrusions 144 connecting the cover sheet 136 to the housing 138 aid in securing the load compensating device 130 to the airfoil rotor blade 132. As also discussed above, the cover sheet 136 may deform to substantially conform to the geometry of the airfoil at the location of the cover sheet 136. That is, the connection of the clamps 142 to the airfoil rotor blade 132 will cause the cover sheet 136 to flatten out to match or substantially correspond to the airfoil geometry. Accordingly, the load compensating device arrangement may be used with virtually any airfoil geometry without requiring a cover sheet that is manufactured to match the geometry. Instead, one generic cover sheet may be used that will conform to the desired geometry.

Figure 12:
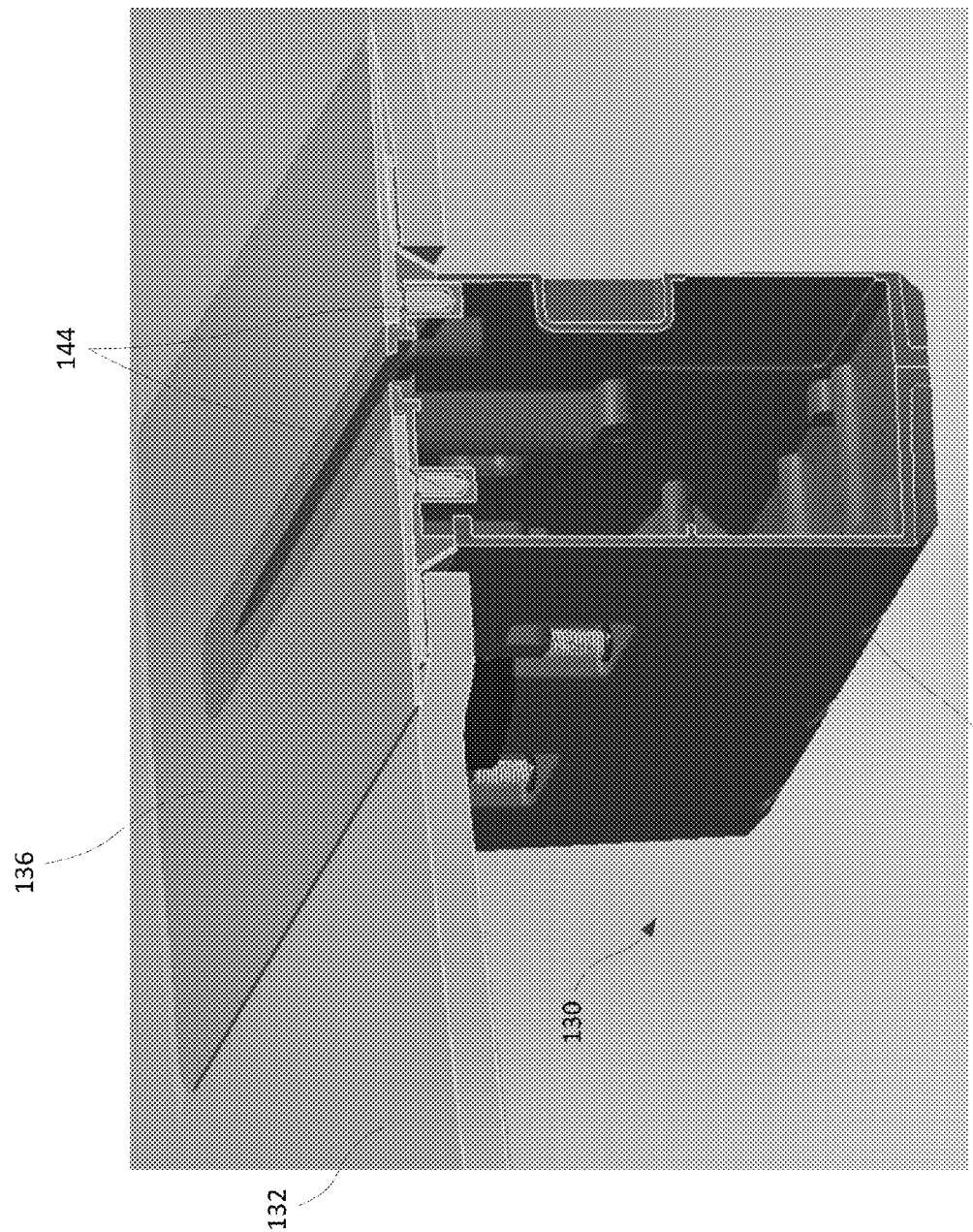
FIG. 12 is a cross-sectional view of the load compensating device mounted to an airfoil rotor blade according to one or more aspects described herein.

FIG. 12 is a cross-section illustrating the cover sheet 136 connected to the housing 138. The protrusions 144 are visible extending into the housing 138. A mounting plate (as will be discussed below) may be positioned between the cover sheet 136 and the housing 138. In some examples, a sealant may be used to adhere the cover sheet edge to the exterior surface of the airfoil rotor blade. As shown, the cover sheet 136 extends across the aperture formed in the airfoil rotor blade and forms a portion of the exterior surface of the airfoil rotor blade. The housing 138 extends downward from the cover sheet 136 and is connected to the cover sheet 136 via protrusions 144. Clamps extend outward from the housing to contact an interior surface of the airfoil rotor blade.

Figure 13:
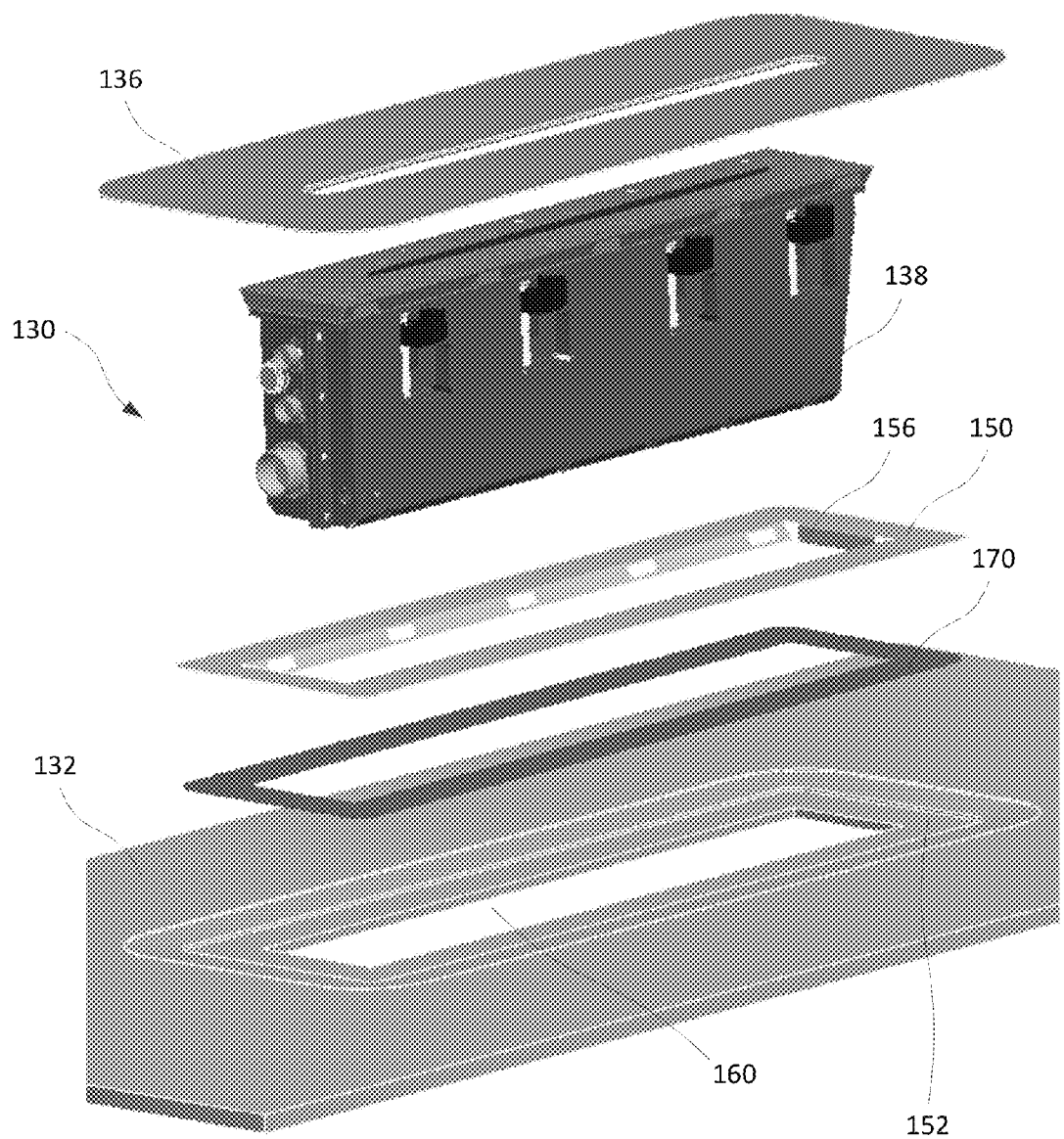
FIG. 13 is an alternate exploded view of the load compensating device according to one or more aspects described herein.

FIG. 13 is an alternate exploded view of the load compensating device 130. Similar to the exploded view of FIG. 7, the load compensating device 130 includes a cover sheet 136, a housing 138 (shown including clamps, etc. for mounting the device) and an airfoil rotor blade 132. The airfoil rotor blade 132 includes aperture 160 surrounded by recess 152. The recess 152 may be configured to receive mounting plate 150. Mounting plate 150 may, in some arrangements, include tab 156 configured to distribute load, as will be discussed more fully below.

In some examples, the mounting plate 150 may be configured to allow the load compensating device 130 (and, in particular, the housing 138) to "float" within the aperture 160 in the airfoil rotor blade 132. For instance, mounting plate 150 may rest in recess 152 (in some examples, a gasket 170, an adhesive backed gasket, or sealant may be arranged between the mounting plate 150 and recess 152). Additionally or alternatively, the mounting plate 150 may be connected to the recess, such as via a glue or other adhesive. The mounting plate 150 may be arranged between the cover sheet 136 and housing 138. As the rotor blade is in operation, the housing 138 (and the load compensating device in general) may move within an aperture formed in the mounting plate (and, accordingly within the aperture 160 in the blade 132) to reduce stress or strain associated with thermal expansion/contraction.

Figure 14:
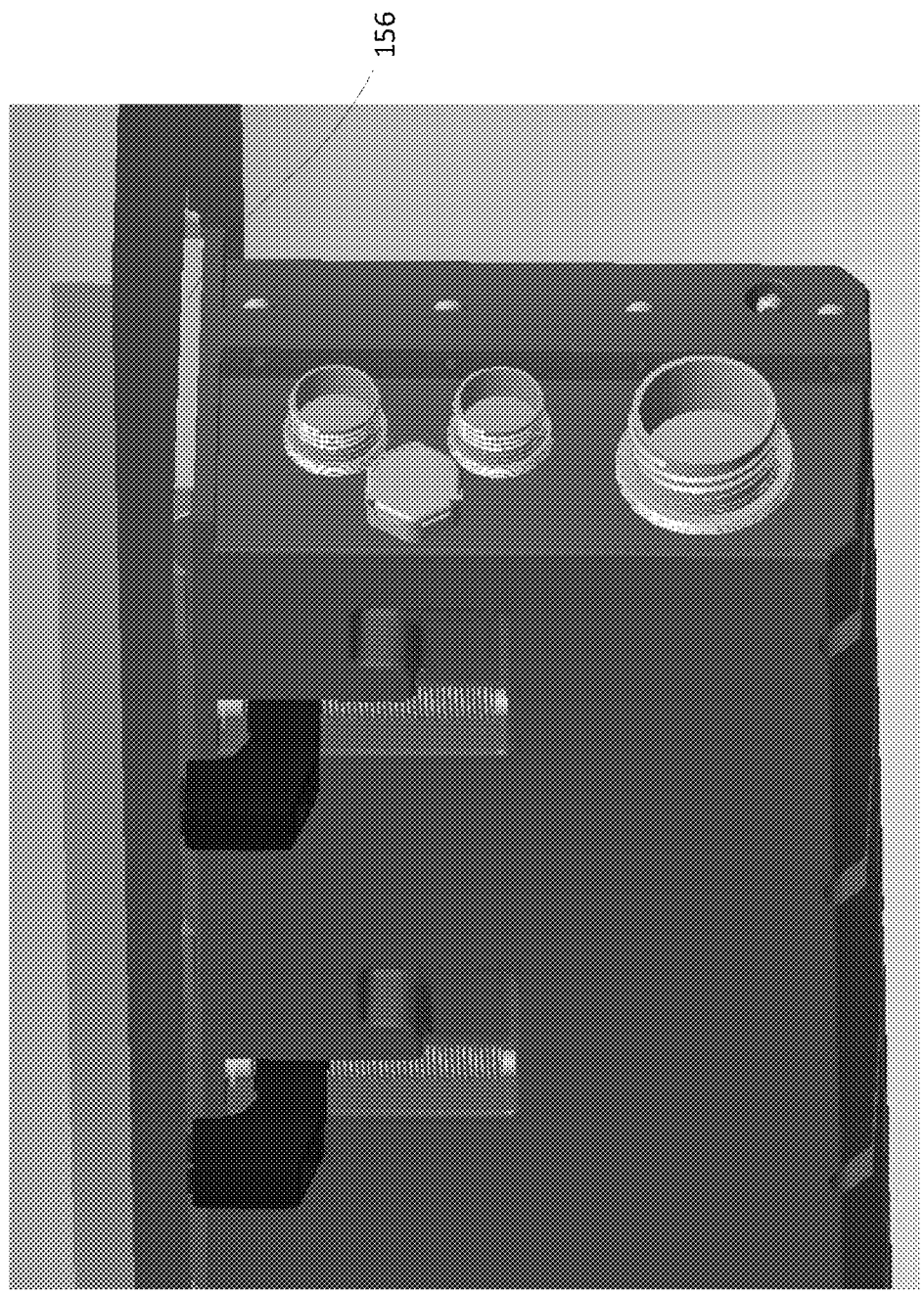
FIG. 14 is a close-up view of one end of the load compensating device according to one or more aspects described herein.

As shown in FIG. 14, in some examples, the mounting plate 150 may include a tab 156 arranged on a tip end of the mounting plate 150. During operation, the centrifugal force will push the floating housing 138 toward the tip end of the blade and, accordingly, the tab 156. The tab 156 will aid in distributing the load or force to the surface of the blade 132. This arrangement, along with the floating housing 138 arrangement, will aid in reducing stress and/or strain from thermal expansion/contraction and/or blade axial or bending strain. In some examples, the cover sheet 136 may also float with the housing 138.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A load compensating device for an airfoil rotor blade, comprising:
   a housing configured to contain an air deflector when in a retracted position, the housing arranged on an interior of the airfoil rotor blade;
   the airfoil rotor blade defining an aperture and having a recess surrounding the aperture formed in a surface of the airfoil rotor blade, wherein the air deflector extends through the aperture in a deployed position and the housing is mounted in the aperture;
   a mounting plate received in the recess surrounding the aperture, wherein the mounting plate includes a tab extending downward from a first end of the mounting plate and the tab is configured to distribute force from the load compensating device to the surface of the airfoil rotor blade,
   wherein the housing is configured to float between the mounting plate and recess.

2. The load compensating device of claim 1, further including a cover sheet connected to the housing and configured to float with the housing.

3. The load compensating device of claim 2, wherein the cover sheet forms a portion of the surface of the airfoil rotor blade.

4. The load compensating device of claim 2, wherein the cover sheet is deformable to substantially conform to an airfoil geometry of the airfoil rotor blade at a location of the load compensating device.

5. A compensating device for an airfoil rotor blade, comprising:
   a housing configured to contain an air deflector when in a retracted position, the housing arranged on an interior of an airfoil rotor blade:
   the airfoil rotor blade defining an aperture having a recess surrounding the aperture formed in a surface of the airfoil rotor blade, wherein the air deflector extends through the aperture in a deployed position and the housing is mounted in the aperture;
   a mounting plate received in the recess surrounding the aperture, wherein the mounting plate includes a tab extending downward from a first end of the mounting plate and the tab is configured to distribute force from the load compensating device to the surface of the airfoil rotor blade,
   a cover sheet connected to the housing and configured to float with the housing
   wherein the mounting plate is arranged between the cover sheet and the housing.

* * * * *